United States Patent [19]

Cohen

[11] 4,175,344

[45] Nov. 27, 1979

[54] VIEWER FOR THE SUCCESSIVE VIEWING OF A NUMBER OF TRANSPARENT IMAGES

[75] Inventor: Izak (Piet) Cohen, Amsterdam, Netherlands

[73] Assignee: Sales Promotion Spits B.V., Amsterdam, Netherlands

[21] Appl. No.: 865,779

[22] Filed: Dec. 29, 1977

[30] Foreign Application Priority Data

Jun. 10, 1977 [NL] Netherlands .................. 7706434

[51] Int. Cl.² ........................................ G02G 27/22
[52] U.S. Cl. ................................................ 40/364
[58] Field of Search ................. 40/364, 361-363, 40/365-367, 381, 508, 509, 513; 350/135

[56] References Cited

U.S. PATENT DOCUMENTS

| 507,529 | 10/1893 | Doe | 40/364 X |
| 2,583,510 | 1/1952 | Ingram | 40/364 |
| 2,674,920 | 4/1954 | Bennett | 350/135 |

FOREIGN PATENT DOCUMENTS 546968 8/1956 Italy .............................. 350/135

Primary Examiner—John F. Pitrelli
Attorney, Agent, or Firm—Haseltine, Lake & Waters

[57] ABSTRACT

A viewer for the successive viewing of a number of transparent images, comprising a casing with a viewing aperture provided with a lens and a counter-aperture aligned therewith which apertures are formed in two opposite faces of the casing, and further comprising a carrier which is detachably fitted in the casing and which supports a number of images in such a way that they are visible from both sides of the carrier, which carrier can be advanced by means of an advancing member that is connected movably to the casing and that is operated manually. The carrier comprises a strip-shaped slide which can move lengthwise through the casing by operating the advancing member and which is provided with means for detachably fixing a film strip thereon.

18 Claims, 12 Drawing Figures

VIEWER FOR THE SUCCESSIVE VIEWING OF A NUMBER OF TRANSPARENT IMAGES

BACKGROUND OF THE INVENTION

The invention relates to a viewer for the successive viewing of a number of transparent images, comprising a casing with a viewing aperture provided with a lens and a counter-aperture aligned therewith, which apertures are formed in two opposite faces of the casing, and further comprising a carrier which is detachably fitted in the casing and which supports a number of images in such a way that they are visible from both sides of the carrier, which carrier can be advanced by means of an advancing member that is connected movably to the casing and that is operated manually.

In a known embodiment of such a viewer, the carrier is round and supports a number of separate images, all of which are located at the same distance from the center of the carrier, in such a way that, when the carrier is rotated intermittently in the casing, these images can be viewed successively through the viewing aperture.

This known viewer entails several disadvantages. First of all, the carriers are relatively expensive, which is all the more objectionable since it is necessary to purchase an appreciable number of carriers with one casing if the viewer is to be used efficiently. Furthermore, the casing of the known apparatus is quite bulky.

SUMMARY OF THE INVENTION

It is an object of the present invention to provide a viewer wherein these drawbacks are effectively eliminated.

To this end, the viewer according to the invention is characterized in that the carrier comprises a strip-shaped slide which can move lengthwise through the casing by operating the advancing member and which is provided with means for detachably fixing a film strip thereon.

According to the invention, it has become possible to connect loose film strips to the slide, which film strips can be made available at relatively low cost. As a result, substantial economies can be realized. Also, the strip shape of the slide allows the viewer to be designed much more compactly.

The slide may have an elongate cavity into which the film strip can be placed, the bottom of the cavity carrying upright fixing pins and being cut away so as to uncover the images of the film strip.

A cover plate can be fitted in the cavity in the slide over the film strip and may have holes which are engaged by the fixing pins on the bottom of the cavity in the slide, the cover plate being cut away so as to uncover the images of the film strip.

According to an important embodiment of the viewer according to the invention, the advancing member co-operates with a spring having a first end portion which can engage the slide so as to impart a length-wise displacement to this slide while the other end portion of the spring is in engagement with the slide, so as to accurately fix this slide into successive positions.

If the apparatus, like the known apparatus, is equipped with a manually operated advancing member in the form of a push button which can be moved up and down in the casing, the slide may be provided on its opposite longitudinal edges with feed teeth and detaining teeth, respectively, the pitch of which feed teeth and detaining teeth corresponds to the pitch width of an image of the strip film, while the first end portion of the spring, as a result of an elastic deformation of the spring upon depression of the push button which engages this spring, meshes with a cavity between two successive feed teeth on the one slide edge, displaces the slide positively in the working direction during its further elastic deformation, and during its recoil, when the push button has been released, initially takes the slide along in the direction opposite to its working direction due to the friction between the first end portion of the spring and the slide edge involved, while the other end portion of the spring continuously engages the detaining teeth on the other slide edge and allows displacement of the slide in the working direction, but during the return motion of the slide meshes with a cavity between successive detaining teeth, thus locking the slide against a further return motion.

BRIEF DESCRIPTION OF THE DRAWINGS

The invention will hereinafter be explained with reference to the drawing.

DESCRIPTION OF A PREFERRED EMBODIMENT

Figure 1:
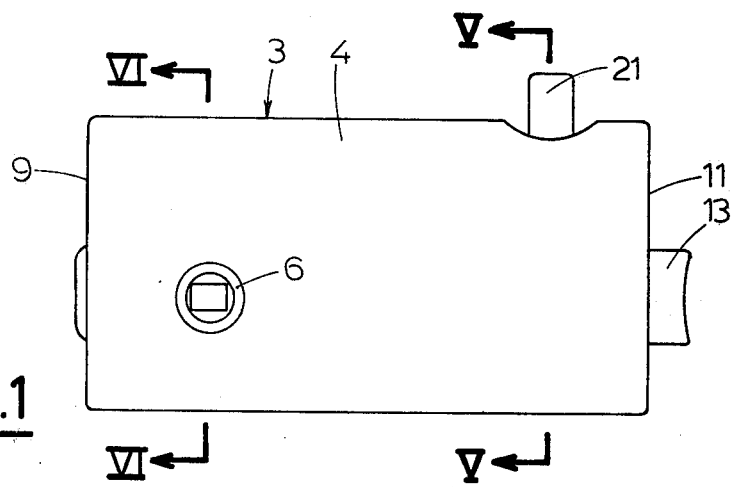
FIG. 1 is a lateral view of an embodiment of the viewer according to the invention.

The drawing illustrates an embodiment of a viewer according to the invention for the successive viewing of a number of images 1 on a transparent film strip 2.

This viewer comprises a casing 3 which has an elongate, flat shape. The large faces 4 and 5 of the casing 3 contain a viewing aperture 7 provided with a lens 6 and a counter-aperture 8 aligned therewith, respectively. Both apertures 7, 8 are situated near the front face 9 of the casing 3 which extends transversely to these large faces 4, 5.

The casing 3 is composed of two jointed parts 3a, 3b which are made of plastics. These parts 3a, 3b can be connected to each other by gluing and/or by means of connecting pins 10 provided in the corners and mating with corresponding holes.

In the front face 9 and in the rear face 11 of the casing 3, passages 12 are formed for a strip-shaped slide 13, which functions as a carrier for the film strip 2. In order to connect film strips 2 detachably to the slide 13, this slide 13 has an elongate cavity 14 into which a film strip 2 can be placed. The bottom of the cavity 14 bears upright fixing pins 15 which mesh with the perforations 16 of the film strip 2.

A cover plate 17 is then fitted in the cavity 14 in the slide 13 over the film strip 2. This cover plate 17 has fixing openings 18 which are engaged by the fixing pins 15 on the bottom of the cavity 14 in the slide 13. Both the bottom of the cavity 14 in the slide 13 and the cover plate 17 have a number of openings 20, which are separated from each other by narrow posts 19 and which are aligned with the images on the mounted, intermediate film strip 2.

After the slide 13 has been pushed into the casing 3 through the passage 12 in the rear face 11, intermittent lengthwise motion through the casing 3 may be imparted to the slide 13, in such a way that the images 1 of the film strip 2 are successively located between the viewing aperture 7 and the counter-aperture 8 in the large faces 4, 5 of the casing 3. For this purpose the casing 3 is equipped with an advancing member constituted by a push button 21 which can be operated manually. This push button 21 can be moved by hand from a rest position (FIG. 2), in which this push button 21 rests with a collar 22 against the inside of the casing 3, to a working position (FIG. 3). During this operation, the push button 21 is displaced in a direction perpendicular to the direction of motion of the slide 13 along guides in the casing 3.

The push button 21 engages a wire-shaped spring 23, which keeps the push button 21 in the rest position while it is not being operated. The spring 23 has a first end portion 24 which can engage the slide 13 so as to impart a lengthwise displacement to this slide 13, while the other end portion 25 of the spring 23 is in engagement with the slide 13 in order to fix this slide 13 accurately in its successive positions.

The slide 13 is provided on its opposite longitudinal edges with feed teeth 26 and detaining teeth 27, respectively, the pitch of these feed teeth 26 and detaining teeth 27 corresponding to the pitch width of an image 1 of the film strip 2.

When the push button 21 is depressed, the spring 23 is elastically deformed, so that its end portion 24 meshes with a cavity between two successive feed teeth 26 on the one longitudinal edge of the slide 13 and moves the slide 13 positively in the working direction during the further elastic deformation of the spring 23.

When the push button 21 is released, the spring 23 recoils and initially takes the slide 13 along in the direction opposite to the working direction due to the friction between the end portion 24 of the spring 23 and the feed teeth 26 on the one longitudinal edge of the slide 13.

The end portion 25 of the spring 23, which continuously engages the detaining teeth 27 on the other longitudinal edge of the slide 13, permits displacement of the slide 13 in the working direction, but meshes during the return motion of the slide 13 with a cavity between successive detaining teeth 27, thus locking the slide 13 against any further return displacement.

The result thus produced is that, in the course of successive operations of the push button 21, the slide 13 is always advanced accurately over one tooth pitch in the working direction, causing a successive image 1 of the film strip 2 to be positioned between the viewing aperture 7 and the counter-aperture 8 in the large faces 4, 5 of the casing 3.

The spring 23 is arranged largely outside the plane of the slide 13, the end portions 24, 25 of the spring 23 being bent out of the plane of the spring 23. In the embodiment shown in the drawing the end portions 24, 25 of the spring 23 are U-shaped. The bases of these U-shaped end portions 24, 25 extend transversely above and below the slide 13, respectively, and co-operate with the feed teeth 26 and the detaining teeth 27, respectively.

In the part 3b of the casing 3, upper and lower guide faces 28 for the slide 13 are formed in the longitudinal direction of the slide 13, interruptions 29 being provided in these guide faces for the passage of the two end portions 24, 25 of the spring 23.

Figure 2:
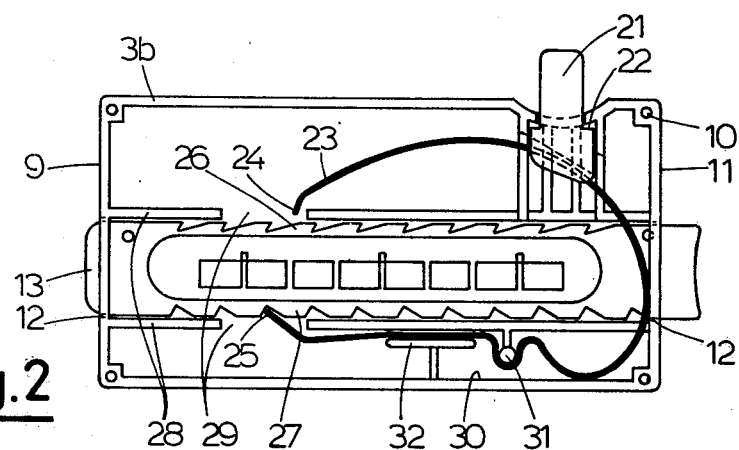
FIG. 2 is a lateral view of the viewer according to FIG. 1 upon removal of the front part of the casing.
Figure 3:
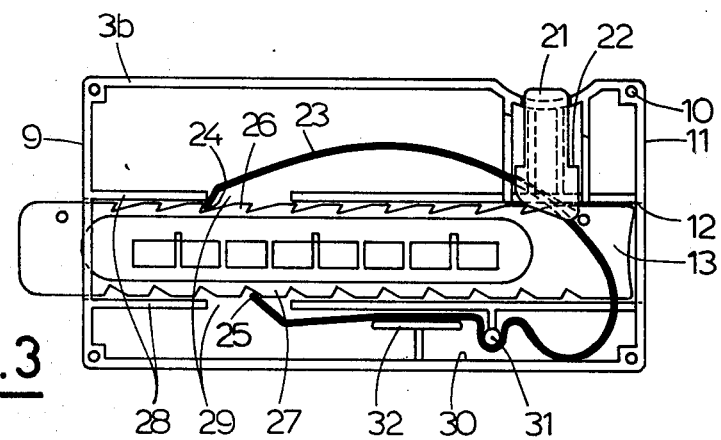
FIG. 3 is a view corresponding to FIG. 2, the push button being depressed so as to displace the slide lengthwise.
Figure 12:
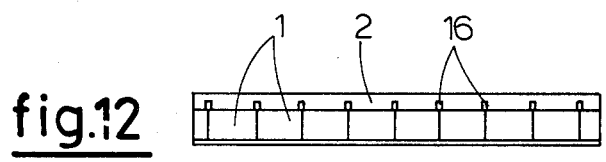
FIG. 12 is a lateral view of the film strip which in FIG. 7 has been fitted in the cavity of the slide.
Figure 10:
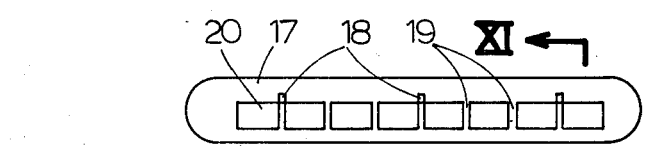
FIG. 10 is a lateral view of the cover plate belonging to the slide according to FIG. 7.
Figure 11:
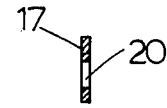
FIG. 11 is a section along the plane XI—XI in FIG. 10.
Figures 8, 9:
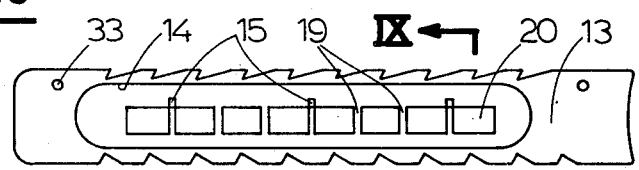
FIG. 8 is a lateral view of the slide according to FIG. 7, from which the film strip and the cover plate have been removed.
FIG. 9 is a section along the plane IX—IX in FIG. 8.
Figure 7:
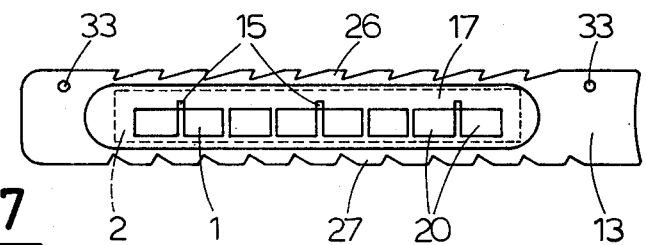
FIG. 7 is a lateral view of the slide of the viewer according to FIG. 1, a film strip and the cover plate having been fitted in its cavity.
Figure 4:
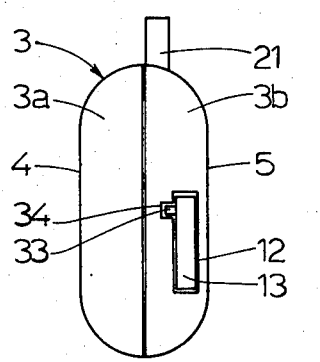
FIG. 4 is a rear view of the viewer according to FIG. 1.
Figure 5:
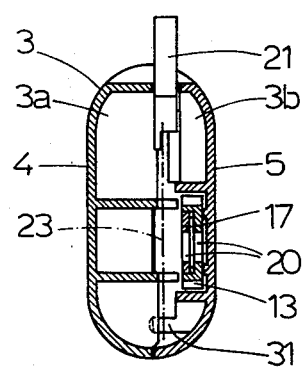
FIG. 5 is a section along the plane V—V in FIG. 1.
Figure 6:
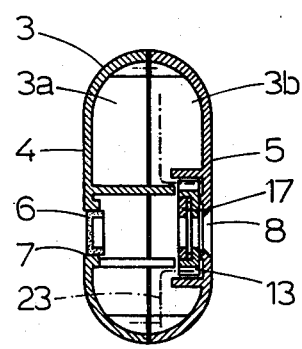
FIG. 6 is a section along the plane VI—VI in FIG. 1.

As shown in FIGS. 2 and 3, the spring 23 first follows a curved course from its end portion 24 on the upper side of the slide 13 where the push button 21 is arranged. The spring 23 subsequently continues its curved course downwardly along the slide 13 in the vicinity of the rear face 11 of the casing 3, whereupon the spring 23 reaches the lower face 30 of the casing 3. The spring 23 then curves upwardly again and embraces with an open-topped loop a fixing pin 31 which is supported by the part 3b of the casing 3. The spring 23 then extends with a substantially linear part in the working direction of the slide 13 over a supporting surface 32 which is formed in the part 3b of the casing 3. The end portion 25 of the spring 23 connects to this last mentioned part of the spring 23 and is inclined upwardly to the slide 13, which it engages in a pre-tensioned state.

The slide 13 carries near its front end and near its rear end off-center transverse pins 33, the passages 12 in the front face 9 and in the rear face 11 of the casing 3 being provided with corresponding lateral slots 34. As a result, moving the slide 13 into the casing 3 can only take place in the proper position, with the spring end 24 co-operating with the feed teeth 26 and the end portion 25 of the spring 23 co-operating with the detaining teeth 27.

According to the invention, a very compact casing 3 is obtained, while the slide 13 can successively be loaded detachably with different film strips 2. Once the slide 13 has been introduced into the casing 3, this slide 13 can be advanced intermittently through the casing 3 by operating the push button 21, the various images 1 of the film strip 2 provided on the slide 13 being capable of being viewed successively through the viewing aperture 7.

The invention is not restricted to the embodiment shown in the drawing by way of example, which can be varied in various manners within the scope of the appended claims.

I claim:

1. A viewer for the successive viewing of a number of transparent images, comprising a casing with a viewing aperture provided with a lens and a counter-aperture aligned therewith which apertures are formed in two opposite faces of said casing, and further comprising a carrier which is detachably fitted in the casing and which supports a number of images in such a way that they are visible from both sides of said carrier, which carrier can be advanced by means of an advancing member that is connected movably to said casing and that is operated manually, said carrier comprising a strip-shaped slide which can move lengthwise through said casing by operating said advancing member and which is provided with means for detachably fixing a film strip thereon, said advancing member co-operating with a spring having a first end portion which can engage said slide so as to impart a lengthwise displacement to said slide, the other end portion of said spring being in engagement with said slide, so as to accurately fix said slide in its successive positions, a manually operated advancing member in the form of a push button which can be moved up and down in said casing, said slide being provided on its opposite longitudinal edges with feed teeth and detaining teeth, respectively, the pitch of said feed teeth and detaining teeth corresponding to the pitch width of an image of said film strip, while the first end portion of said spring, as a result of an elastic deformation of said spring upon depression of the push button engaging said spring, meshes with a cavity between two successive feed teeth on the one slide edge, displaces said slide positively in the working direction during its further elastic deformation, and during its recoil, when said push button has been released, initially takes said slide along in the direction opposite to its working direction due to the friction between said first end portion of said spring and the slide edge involved, while the other end portion of said spring continuously engages the detaining teeth on the other slide edge and allows displacement of said slide in the working direction but during the return motion of said slide meshes with a cavity between successive detaining teeth, thus locking said slide against a further return displacement.

2. A viewer according to claim 1, wherein the spring is wire-shaped and is arranged largely outside the plane of the slide, the end portions of the spring being bent out of the plane of the spring.

3. A viewer according to claim 2, wherein the end portions of the spring are U-shaped, whilst the bases of these U-shaped spring ends extend transversely above and below the slide, respectively, and co-operate with the feed teeth and the detaining teeth.

4. A viewer according to claim 1, wherein the casing has an elongate, flat shape, the viewing aperture and the counter-aperture being located in its large faces near the front face which is arranged transversely thereto, whilst passages for the slide are formed in the front face and in the rear face of the casing.

5. A viewer according to claim 4, wherein the slide carries a transverse pin near its front end, the passages in the front face and in the rear face of the casing being provided with corresponding lateral slots.

6. A viewer according to claim 4, wherein upper and lower guide faces for the slide are formed in the casing in the longitudinal direction of the slide, interruptions being provided in these guide faces for the passage of the two end portions of the spring.

7. A viewer according to claim 1, wherein guides for the push button are formed in the casing, the direction of displacement of the push button being at least substantially perpendicular to the direction of motion of the slide.

8. A viewer according to claim 1, wherein the casing is composed of two parts made of plastics, these parts being connected to each other, for example, by gluing.

9. A viewer for the successive viewing of a number of transparent images, comprising a casing with a viewing aperture provided with a lens and a counter-aperture aligned therewith which apertures are formed in two opposite faces of said casing, and further comprising a carrier which is detachably fitted in the casing and which supports a number of images in such a way that they are visible from both sides of said carrier, which carrier can be advanced by means of an advancing member that is connected movably to said casing and that is operated manually, said carrier comprising a strip-shaped slide which can move lengthwise through said casing by operating said advancing member and which is provided with means for detachably fixing a film strip thereon, said advancing member co-operating with a spring having a first end portion which can engage said slide so as to impart a lengthwise displacement to said slide, the other end portion of said spring being in engagement with said slide, so as to accurately fix said slide in its successive positions, said spring from its first end portion initially following a curved course on the upper side of said slide where the push button is arranged, subsequently continuing its curved course downwardly along the slide in the vicinity of the rear face of said casing and reaching at least substantially the lower face of said casing, whereupon it curves upwardly again, embracing with an open-topped loop a fixing pin which is supported by said casing, and then extending with a substantially linear part in the working direction of said slide over a supporting surface formed in said casing, while its other end portion, which connects to this last mentioned spring part, is inclined upwardly to said slide.

10. A viewer for the successive viewing of a number of transparent images, comprising a casing with a viewing aperture provided with a lens and a counter-aperture aligned therewith, said apertures being formed in two opposite faces of said casing, and further comprising a carrier which is detachably fitted in said casing and which supports a number of images in such a way that they are visible from both sides of said carrier, which carrier can be advanced by means of an advancing member that is connected movably to said casing and that is operated manually, said carrier comprising a strip-shaped slide which can be moved lengthwise through said casing by operating the advancing member and which is provided with means for fixing a film strip, said viewer further comprising spring means having a first end portion which can engage said slide so as to impart a lengthwise displacement to said slide upon actuation of the advancing member, while an other end portion of said spring means is in engagement with said slide, so as to accurately fix said slide in its successive positions, said slide being provided on its opposite longitudinal edges with feed teeth and detaining teeth, respectively, the pitch of said feed teeth and said detaining teeth corresponding to the pitch width of an image of said film strip, while said first end portion of said spring means, as a result of an elastic deformation upon actuation of said advancing member, meshes with a cavity between two successive feed teeth on the one slide edge and displaces said slide positively in the working direction, while said first end portion, during its recoil when said advancing member has been released, initially takes said slide along in the direction opposite to its working direction due to the friction between said first end portion and the slide edge involved, while the other end portion of said spring means continuously engages the other slide edges and allows displacement of said guide in the working direction, but during the return motion of said slide meshes with a cavity between successive detaining teeth, thus locking said slide against a further return displacement.

11. A viewer according to claim 10, wherein said spring means is wire-shaped and is arranged largely outside the plane of said slide, said end portions of said spring means being bent out of the plane of said spring means.

12. A viewer according to claim 11, wherein said end portions of said springs means are U-shaped, while the bases of these U-shaped spring ends extend transversely above and below the slide, respectively, and co-operate with said feed teeth and said detaining teeth.

13. A viewer according to claim 10, wherein said spring means comprises a spring which from said first end portion initially follows a curved course on the upper side of said slide where a push button is arranged which can be moved up and down in the casing, subsequently continues its curved course downwardly along said slide in the vicinity of the rear face of said casing and reaches at least substantially the lower face of said casing, whereupon it curves upwardly again, embraces with the open-topped loop a fixing pin which is supported by said casing, and then extends with a substantially linear part in the working direction of said slide over a supporting surface formed in said casing, while said other end portion, which connects to this last mentioned spring part, is inclined upwardly to said slide.

14. A viewer according to claim 13, wherein guides for the push button are formed in the casing, the direction of displacement of the push button being at least substantially perpendicular to the direction of motion of the slide.

15. A viewer according to claim 10, wherein the casing has an elongate, flat shape, the viewing aperture and the counter-aperture being located in its large faces near the front face which is arranged transversely thereto, passages for said slide being formed in the front face and in the rear face of said casing.

16. A viewer according to claim 15, wherein said slide carries a transverse pin near its front end, the passages in the front face and in the rear face of said casing being provided with corresponding lateral slots.

17. A viewer according to claim 15, wherein upper and lower guide faces for said slide are formed in said casing in the longitudinal direction of said slide, interruptions being provided in said guide faces for the passage of said two end portions of said spring means.

18. A viewer according to claim 10, wherein said slide has an elongate cavity into which said film strip can be placed, the bottom of said cavity carrying upright fixing pins and being cut away so as to uncover the images of said film strip, a cover plate being fitted in said cavity in said slide over said film strip and having holes which are engaged by said fixing pins on the bottom of said cavity in said slide, the bottom of the cavity in said slide and said cover plate having a number of openings which are separated from each other by narrow posts and which are aligned with the images on said film strip.

* * * * *